United States Patent [19]

Brown et al.

[11] Patent Number: 4,628,301

[45] Date of Patent: Dec. 9, 1986

[54] ELECTRICAL CIRCUIT ARRANGEMENTS

[75] Inventors: Alfred R. Brown, Stanwell; Richard A. Whetton, Maidenhead, both of England

[73] Assignee: Graviner Limited, Buckinghamshire, England

[21] Appl. No.: 666,399

[22] Filed: Oct. 30, 1984

[30] Foreign Application Priority Data

Nov. 4, 1983 [GB] United Kingdom ................. 8329473

[51] Int. Cl.[4] ........................ G08B 17/06; G01K 7/00

[52] U.S. Cl. .................................... 340/584; 374/184; 374/170

[58] Field of Search ............... 340/584, 587, 512, 507, 340/635, 519, 517; 331/66; 361/282; 374/183, 184, .170; 364/557

[56] References Cited

U.S. PATENT DOCUMENTS

| | | | |
|---|---|---|---|
| 3,540,041 | 11/1970 | Payne | 340/409 |
| 4,247,848 | 1/1981 | Kitta et al. | 340/587 X |

FOREIGN PATENT DOCUMENTS

| | | | |
|---|---|---|---|
| 0087308 | 8/1983 | European Pat. Off. . | |
| 1247180 | 8/1967 | Fed. Rep. of Germany . | |
| 1261026 | 2/1968 | Fed. Rep. of Germany . | |
| 2641574 | 3/1978 | Fed. Rep. of Germany | 361/282 |
| 2804523 | 8/1979 | Fed. Rep. of Germany | 340/584 |
| 0075298 | 6/1977 | Japan | 519/ |
| 872042 | 7/1961 | United Kingdom . | |
| 953166 | 3/1964 | United Kingdom . | |
| 1006208 | 9/1965 | United Kingdom . | |
| 1013797 | 12/1965 | United Kingdom . | |
| 1151691 | 5/1969 | United Kingdom . | |
| 1228931 | 4/1971 | United Kingdom . | |
| 2065348 | 6/1983 | United Kingdom . | |

*Primary Examiner*—James L. Rowland
*Assistant Examiner*—Anne Marie F. Capati
*Attorney, Agent, or Firm*—Leydig, Voit & Mayer

[57] ABSTRACT

A fire detecting arrangement has a longitudinal fire detector having conductors separated by a substance whose resistance decreases with temperature and whose charge acceptance capability increases with temperature. The detector is supplied with a rectangular waveform swinging between +5 and −5 volts through resistors, one of which is high compared with the other. High temperature will therefore cause a greater volt drop across the detector during positive waveform portions than during negative waveform portion, the potential division effect of the unequal resistors being enhanced by the increased charging current. Contamination or damage merely decreases the resistance of the detector and the lack of charging current means that the inequality of the voltage drops during positive and negative portions of the drive waveform is not so marked. A comparator compares the voltage across the detector with different reference levels at predetermined time instants synchronised with the drive waveform to produce digital signals which are fed to shift registers to cause a "fire" or "fault" warning to be produced.

23 Claims, 3 Drawing Figures

ELECTRICAL CIRCUIT ARRANGEMENTS

BACKGROUND OF THE INVENTION

The invention relates to electrical circuit arrangements and more particularly to temperature-responsive electrical circuit arrangements. One such circuit arrangement to be described by way of example is for use with a temperature detector of the type whose capability of accepting an electrical charge increases with temperature; the circuit arrangement determines the electrical state of the detector and thus can determine whether its temperature is excessive. Such a temperature detector may advantageously be of linear form so as to be mountable around an area whose temperature is to be monitored.

BRIEF SUMMARY OF THE INVENTION

According to the invention there is provided an electrical circuit arrangement for monitoring the state of detecting means whose charge storage capability increases under predetermined conditions, comprising driving means operative to apply an alternately positive and negative test waveform to the detecting means, and digital testing means operative at predetermined time instants during positive and negative portions of the test waveform to determine assymmetry of the waveform caused by an increase in the charge storage capabilities of the detecting means.

According to the invention there is also provided a temperature responsive system, comprising a longitudinal temperature detector of the type whose electrical charge storage capability increases with increasing temperature, driving means operative to apply a symmetrical alternately positive and negative rectangular waveform to the detector, comparing means connected to compare the instantaneous magnitude of the waveform applied to the detector with a plurality of different and predetermined thresholds whereby to produce digital signals indicating whether the instantaneous magnitude of the waveform is more positive or more negative than the respective threshold, testing means operative in response to receipt of a predetermined plurality of said digital signals indicating that, during each of the predetermined plurality of positive portions of the said waveform, the instantaneous magnitude thereof is less than a first, relatively low positive, one of the said thresholds, whereby to produce a high temperature warning output, fault sensing means operative in response to a predetermined plurality of consecutive said digital signals indicating that the instantaneous magnitude during each of a plurality of negative portions of the said waveform is less negative than a second, relatively high negative, one of the said thresholds, whereby to produce a fault warning output, and means preventing the fault warning output being produced during the existence of the high temperature warning output.

According to the invention there is further provided a method of sensing temperature increase using a temperature detector in the form of coaxial conductors separated by temperature-responsive material which increases the charge storage capacity between the conductors as its temperature increases, comprising the steps of applying an alternately positive and negative test waveform to the detector, and sampling the test waveform at predetermined time instants during positive and negative portions thereof to determine asymmetry of the waveform caused by an increase in its charge storage capacity of the detector.

DESCRIPTION OF THE DRAWINGS

Electrical circuit arrangements embodying the invention will now be described, by way of example only, with reference being made to the accompanying drawings in which.

DESCRIPTION OF PREFERRED EMBODIMENTS

Figure 1:
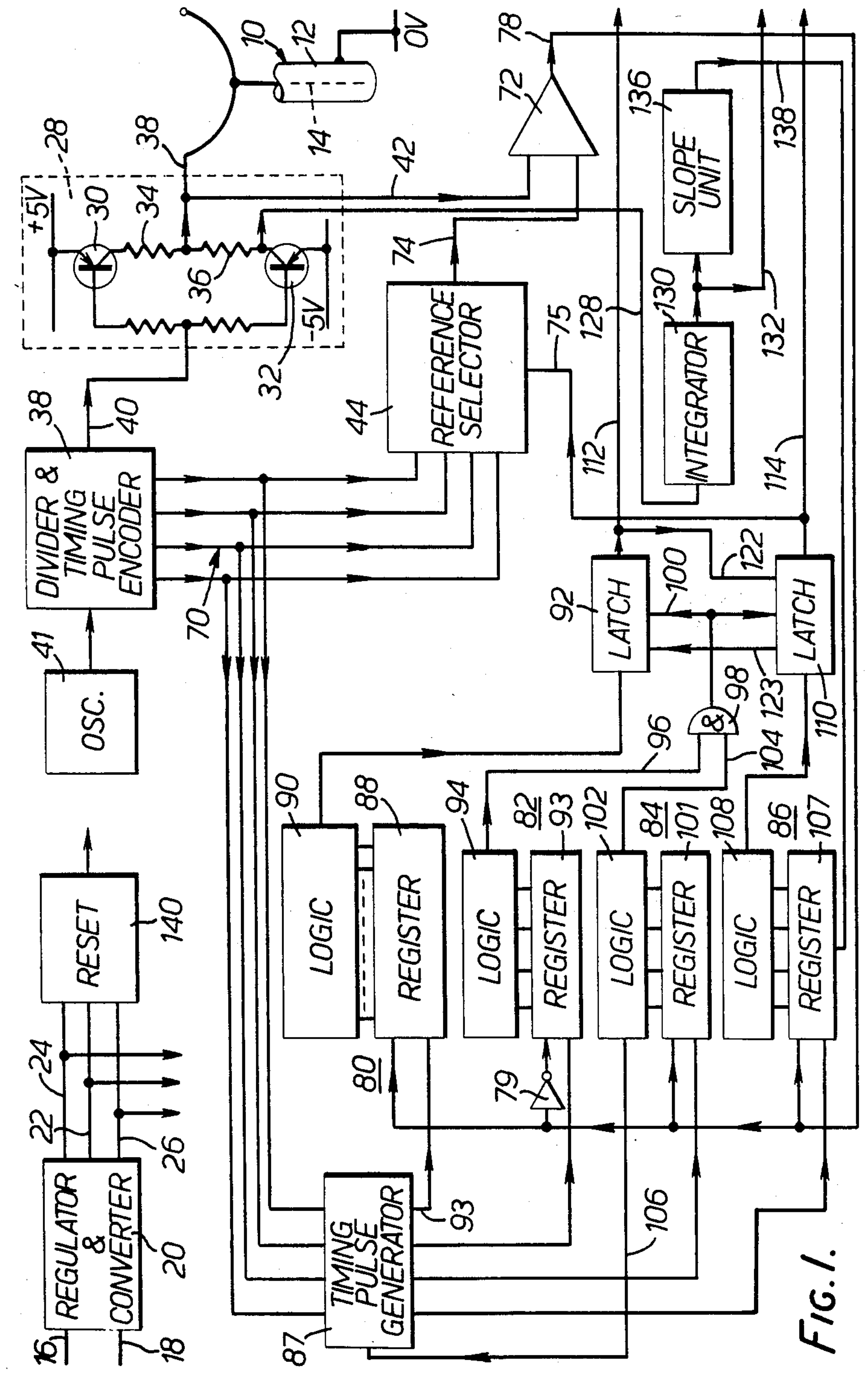
FIG. 1 is a block circuit diagram of one of the circuit arrangements.

In the circuit arrangement now to be more specifically described, the linear temperature detector is shown at 10. The detector comprises an elongated conductive sheath 12 of circular cross-section having an inner coaxial conductor 14. An insulating material separates the conductors 12 and 14 and is such that the capability of the detector to accept an electrical charge increases with temperature. For example, the detector may be of the form as sold by the Applicants under the Trade Mark FIREWIRE. In the electrical circuit arrangement to be described, one of the conductors of the detector 10 is held at ground potential and the other is subjected to a rectangular waveform which renders it alternately positive and negative (swinging in this example between plus 5 and minus 5 volts). Thus, when the detector 10 is at normal ambient temperature, the impedance of the detector is high and the voltage across the detector will swing between plus 5 and minus 5 volts in correspondence with the applied waveform. However, as the temperature increases, the detector's resistance will decrease and its capability of accepting charge will increase. The result will be that the voltage across the detector during the positive "half cycles" or waveform portions will be reduced as compared with that across the detector during the negative portions because the positive portions of the drive waveform are applied to the detector through a higher value resistor than are the negative portions. The greater reduction in voltage across the detector during the positive portions is partly due to the potential dividing effect of the higher value resistor but is also due to the increased current which flows because of the detector's enhanced charge accepting capabilities. This characteristic is detected by the circuit arrangement to be described so as to give a warning in response to elevated temperature of the detector. In the arrangement being described, this warning of elevated temperature is assumed to be a warning of a "fire" condition.

A fault condition (such as caused by contamination or mechanical damage to the detector), which causes the electrical resistance between the conductors 12 and 14 to decrease, will have a different effect. The inequality between the decrease in voltage across the detector during positive waveform portions and the decrease in that voltage during negative waveform portions will not be so great because the detector's capability of accepting charge is not increased and therefore the increased volt drop effect of the charging current is not present. The circuit arrangement to be described uses this effect to detect and signal such a fault.

As shown in FIG. 1, the circuit arrangement is (in this example) powered by a 28 volt DC supply on lines 16 and 18. A regulator and converter arrangement 20 produces a stabilised DC output on lines 22 (0 volts), 24 (plus 5 volts) and 26 (minus 5 volts). Line 22 is connected to conductor 12 of the detector 10 while lines 24 and 26 energise the plus 5 volt and minus 5 volt rails of a driver circuit 28 via connections not shown. The circuit 28 comprises transistors 30 and 32 having their collectors connected to feed the conductor 12 of the detector 10 by respective resistors 34 and 36; these are the unequal resistors referred to above and may have resistances of 2700 and 430 ohms for example. The transistors are rendered conductive alternately, thus applying a rectangular waveform, swinging between plus 5 volts and minus 5 volts, to the conductor 14 of the detector 10 via line 38.

The transistors 30 and 32 are rendered conductive alternately by a 400 Hz signal from a divider and timing pulse encoder unit 38 on a line 40.

The unit 38 is driven by a 3.2 KHz oscillator 41 whose output frequency is divided down by 8 in the unit 38.

The waveform shown in FIG. 2A is thus the output waveform of the driver circuit 28 and is therefore the nominal waveform on line 42 (FIG. 1) when the detector 10 is cold so as to have effectively no charge storage capability.

As explained above, in order to monitor the electrical condition of the detector 10, to determine its charge storage capability and thus its temperature, it is necessary to monitor the voltage across the detector during each waveform portion. A reference selector 44 provides a sequence of voltage references against which the voltage across the detector 10 during each waveform portion is compared. The reference selector 44 comprises a potential divider of resistors connected between a plus 5 volt rail energised from line 24 and a minus 5 volt rail energised from line 26. The resistors are selected so as to provide tapped reference voltages of plus 3 volts, plus 1.35 volts, plus 0.5 volts, minus 2.35 volts, and minus 3.5 volts. The reference selector 44 is controlled in correspondence with the output of the divider and timing pulse encoder unit 38 via lines 70. The lines 70 therefore select each of the reference voltages in turn and the corresponding reference voltage is fed to a comparator 72 on a line 74.

Waveform 2B shows the sequence of the voltage references. During normal, fault-free, operation of the detector the selector 44 (FIG. 1) produces reference voltages of +1.35 volts and +0.5 volts alternately for successive positive portions of waveform 2A. However, if a fault should occur (as will be explained in more detail below), a line 75 (FIG. 1) causes the selector 44 to select and produce the reference of +3.0 volts instead of plus 1.35 volts (through during the intervening positive portions, the reference voltage continues to be plus 0.5 volts), all as shown in waveform 2B.

As shown by waveform 2B, during each negative portion of the drive waveform 2A, the selector 44 (FIG. 1) selects the reference voltage of minus 3.5 volts for the first half of the portion and minus 2.35 volts for the remainder of that portion. The reference voltages applied during the negative portions of the drive waveform are unaffected by any fault condition.

The comparator 72 carries out a comparison of the voltage across the detector 10 in line 42 with the reference voltage waveform 2B on line 74. The output of comparator 72 is in the form of a binary signal, that is, "1" or "0". Thus, if the voltage on line 42 is more negative than the voltage on line 74, comparator 72 produces a "1" output on a line 78 but a "0" output is produced in the reverse condition. Line 78 is connected in common to four "smoother" units 80,82,84 and 86, each of which comprises a respective shift register whose outputs are fed into suitable logic circuitry driving an output latch. Each shift register is clocked by a respective sequence of clock signals derived from the unit 38 via lines 70 and a timing pulse generator 87.

As shown in FIG. 1, the smoother unit 80 comprises a shift register 88 having eight stages, the stage outputs being fed into a logic unit 90 driving a latch 92. The shift register 88 is clocked by clock pulses TP1A, these being received from the unit 87 on a line 93. As shown in waveform 2A, pulses TP1A occur during alternate portions of the reference waveform 2B. Therefore, each pulse TP1A clocks into the shift register 88 a binary signal (on line 78) having a value depending on whether the voltage across the detector 10 is above or below the plus 0.5 volt reference. As shown in waveform 2B, the pulses TP1A normally occur three quarters of the way through each alternate positive portion. However, they can occur at a different position, one quarter of the way through each alternate portion, as shown dotted.

The smoother 88 therefore sets the latch 92 after eight consecutive pulses TP1A (arranged over 16 positive waveform portions) have occurred, at each of which the waveform from the detector is below 0.5 volts.

Figure 2:
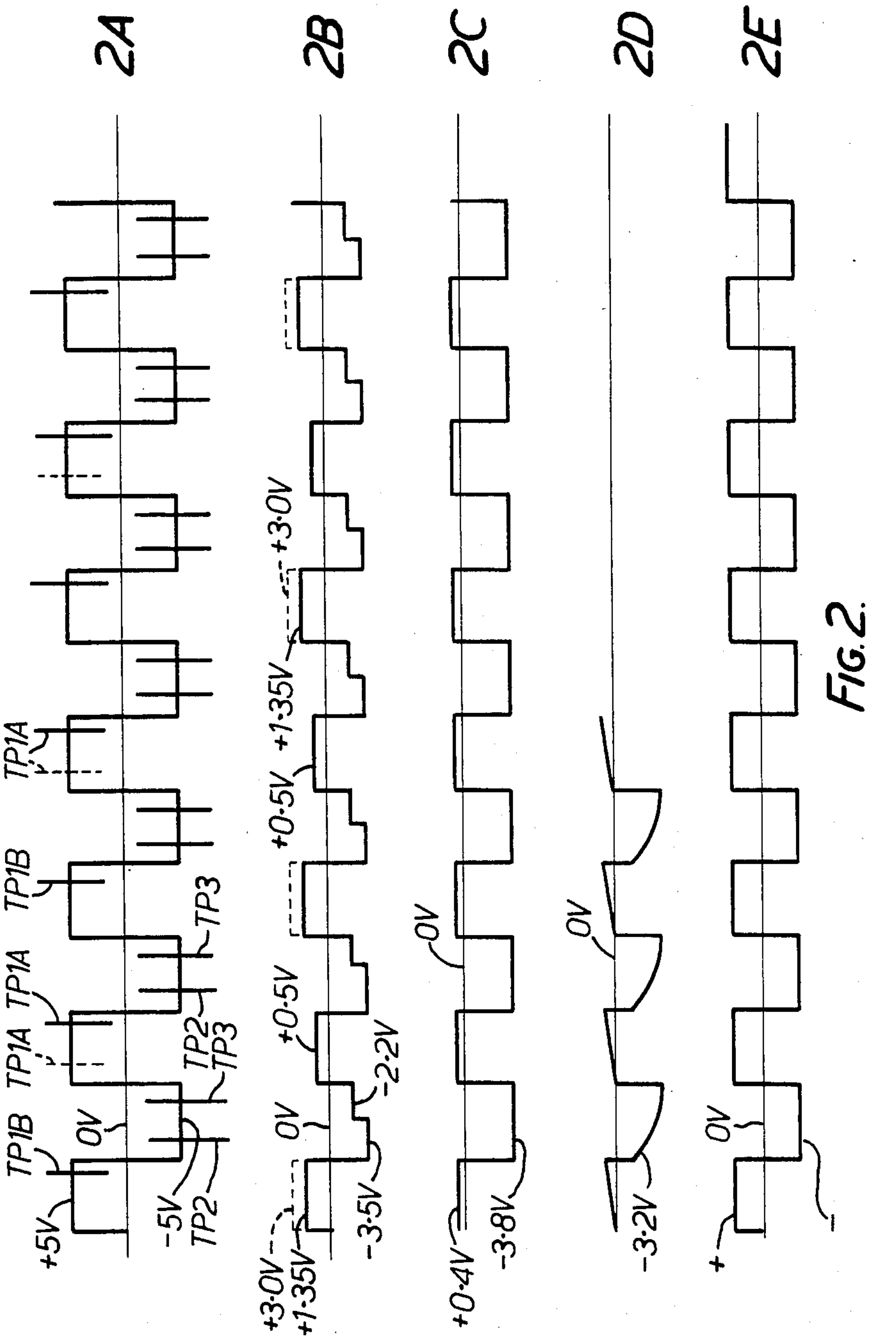
FIGS. 2 and 3 show waveforms occurring in the circuit of FIG. 1.

Smoother 82 is again in the form of a shift register 93, this time having four stages which are connected to logic 94. The smoother 82 is clocked by clock pulses TP1B received from the unit 87. As shown in FIG. 2, the pulses TP1B occur during alternate positive waveform portions, the waveform portions during which the pulses TP1A do not occur. Each pulse TP1B occurs at a point three quarters of the way through its respective waveform portion. Each pulse TP1B therefore tests whether or not the waveform from the detector is above either plus 1.35 volts or plus 3.00 volts depending on the particular reference level during the waveform portion. As was explained above, under certain conditions the selector 44 alters the reference level on line 74 during alternate waveform portions from plus 1.35 volts to plus 3.0 volts and these alternate waveform portions are synchronised with the pulses TP1B. If, at each occurence of a pulse TP1B, the comparator 72 determines that the waveform from the detector 10 is more positive than the reference waveform on line 74, it produces a "0" output which is clocked into the register 93 by the pulse TP1B. When four such consecutive outputs are clocked into the register, the logic unit 94 produces a signal RE on a line 96 which is fed to an AND gate 98 connected to a reset line 100.

Smoother 84 comprises a shift register 101 having four stages which are all connected to logic 102. Register 101 is clocked by pulses TP2 from the unit 87 and as shown in FIG. 2, these occur during each negative portion of the drive waveform. Each occurs one quarter of the way through its respective portion and thus occurs when the reference level on line 74 is minus 3.5 volts. If comparator 72 determines that the waveform from the detector 10 is more negative than minus 3.5 volts, line 78 will carry a "1" when each pulse TP2 occurs and this will be clocked into the register 101. If four such consecutive binary signals are produced, the logic 102 produces a latched output $\overline{CH}$ on a line 104. If the detector waveform is not more negative than minus 3.5 volts when each pulse TP2 occurs, binary "0" signals will be produced on line 78 and the logic 102 will be latched into a state in which it produces a signal $\overline{CH}$ on a line 106. As shown in FIG. 1, the signals $\overline{CH}$ are passed through the gate 98 onto the reset line 100, while the signals CH are passed to the unit 87 where they shift the time of occurrence of the pulses TP1A to the dotted position shown in waveform 2A.

Smoother 86 is in the form of a four stage shift register 107 whose stages are connected to logic 108 which controls a latch 110. The shift register 107 is clocked by pulses TP3 from the unit 87 and as shown in waveform 2A these occur during every negative portion of the drive waveform 2A, each one occurring at three quarters of the way through the portion. Thus, each pulse TP3 occurs when the reference level on line 74 is at minus 2.2 volts. If the waveform from the detector is more negative than minus 2.2 volts when each pulse TP3 occurs, a binary "1" will be clocked into the shift register 107. After four such consecutive binary signals, the logic 108 will produce a signal FA. If the waveform from the detector 10 is not more negative than the reference level on line 74 when each pulse TP3 occurs, a binary "0" will be produced, and four such binary signals will cause logic 108 to produce a signal FA which will latch the latch 110 into a "fault" state.

Latches 92 and 110 are connected to be reset by the reset line 100.

When set, latch 92 produces a fire warning signal on line 112. Similarly, when set, the latch 110 produces a fault warning signal on a line 114.

The operation of the circuit arrangement as so far described will now be considered.

The first condition to be considered will be when the detector 10 is cold or at normal ambient temperature and with no fault. The waveform produced by the detector, that is, the waveform on line 42, can therefore be considered to be as shown in FIG. 2A, that is, substantially unchanged from the drive waveform. Therefore, during each pulse TP1A, the comparator 72 will produce a binary "0" signal and the latch 90 will therefore not be set and no signal will be produced on line 112. During each pulse TP1B, the comparator 72 will also be producing a binary "0" signal because the waveform from the detector will be more positive than plus 1.35 or plus 3.00 volts. After four such binary signals, logic 94 will therefore be set to produce a signal RE on the line 96 which will be fed to AND gate 98. During each pulse TP2, comparator 72 will determine that the waveform from the detector is more negative than the reference level and will produce a binary "1". Four such binary signals will thus cause the latch 102 to produce the signal CH and this will be fed to gate 98. Line 100 will therefore be energised to carry a RESET level.

During each pulse TP3, the comparator 72 will determine that the waveform from the detector is more negative than the reference level and will again produce a "1" output. Four such binary signals will cause the logic 108 to produce a signal FA, and the latch 110 will therefore not be set.

The effect, therefore, is that neither a fire warning nor a fault warning is produced. The RESET level on line 100 therefore has no effect because the latches 92 and 110 are already in the reset state.

It will now be assumed that a fire or other overheat occurs. As explained above, this will increase the charge acceptance capability of the detector 10. The result will be to cause a significant reduction in the level of the detector waveform on line 42, FIG. 1, during each positive waveform portion, while making relatively insignificant change in the level during each negative waveform portion. The type of change which might occur is shown in waveform 2C.

Therefore, the comparator 72 will be producing a binary "1" output when each pulse TP1A occurs. After eight such signals (16 positive waveform portions), the latch 92 will be set and will produce a fire warning signal on line 112.

During each pulse TP1B, the comparator 72 will also be producing a "1" output, but because of the inverter 79, latch 94 will not be set and no signal RE will be produced.

As is shown in waveform 2C, it is assumed that the output waveform from the detector remains more negative than minus 3.5 volts during each negative waveform portion. Therefore, during each pulse TP2, a binary "1" signal will be produced by the comparator 72. After four such signals have been received, logic 102 will produce a $\overline{CH}$ output, rather than a CH output. However, the $\overline{CH}$ output will be blocked by the AND gate 98. Line 106 will not be energised.

During each pulse TP3, the comparator 72 will also produce a binary "1" output and therefore latch 110 will not be set into the FAULT condition and no fault warning will be produced on line 114.

If the fire or overheat condition should disappear, the waveform from the detector 10 will change back towards that shown in FIG. 2A. If the level of the detector waveform during positive portions remains above plus 1.35 volts for four consecutive positive portions, the corresponding pulses TP1B will cause the inverter 79 to clock binary "1" signals into the register 93 and latch 94 will thus produce a RE signal on line 96 to the AND gate 98. Provided that the waveform from the detector is also more negative than minus 3.5 volts during four consecutive portions, the corresponding pulses TP2 will clock binary "1" signals into the register 101 and the logic 102 will thus produce a $\overline{CH}$ output to AND gate 98. Line 100 will thus carry a RESET signal which will reset the latch 92 (latch 110 already being in the reset state). The fire signal on line 112 will thus be removed.

If the detector 10 should be subjected to a very fierce overheat or fire, so that its temperature rises very rapidly, the waveform on line 128 may (at least initially) become as shown in FIG. 2D. This shows that the voltage three quarters of the way through each positive portion has not dropped below plus 0.5 volts. Therefore, the comparator 72 will not be producing binary "1" outputs when pulses TP1A occur three quarters of the way through each alternate positive waveform portion. Latch 92 would therefore not be set into the FIRE state and no fire warning would be produced. Register 101 deals with this condition. As is shown in waveform 2D, the voltage of the detector waveform during negative portions is more positive than minus 3.5 volts. Each pulse TP2 will therefore cause a binary "0" to be clocked into the register and logic 102 will therefore produce a CH output on line 106. This has the effect of causing the unit 87 to shift the positions of the pulses TP1A to the positions shown dotted in waveform 2A. At each dotted position of pulse TP1A, the waveform shown in FIG. 2D is more negative than the reference level of 0.5 volts, and thus eight pulses TP1A (in the dotted position) will cause eight binary "1" signals to be clocked in to register 88 so as to set the latch 92 into the FIRE state, producing a fire warning on line 112.

If the detector becomes contaminated or mechanically damaged, for example, in such a way that the resistance between the conductors 12 and 14 becomes reduced, this will have the effect of reducing the voltage across the detector during both positive and negative waveform portions. FIG. 2E shows the form which the waveform from the detector can take under such conditions. In waveform 2E, it will be noted that the voltage remains above 0.5 volts during positive waveform portions and therefore the latch 92 will not be set into the FIRE state and no fire warning will be produced. During positive waveform portions, however, the voltage of the waveform 2E is more negative than plus 1.35 volts so logic 94 is not set into the RE state.

During negative waveform portions the detector waveform is less negative than minus 3.5 volts, so the logic 101 will produce a CH output on line 106 after four such waveform portions. However, the resultant shifting of the pulses TP1A to the dotted position shown in waveform 2A will not have any effect.

During its negative portions, waveform 2E is less negative than minus 2.2 volts and therefore binary "1" signals will be fed into register 86, and four such binary signals will cause the latch 110 to be set into the FAULT condition so as to produce a fault warning on line 114.

The fault warning on line 114 is also fed via line 75 to the selector 44 and has the effect of changing the reference level applied to the comparator 72 on line 74 during alternate positive waveform portions from plus 1.35 volts to plus 3.00 volts. Therefore, when the fault condition disappears, register 93 will not set the logic 94 into the RE state until the waveform from the detector 10 has been more positive than plus 3 volts for four pulses TP1B. Provided that the waveform from the detector 10 is also more negative than minus 3.5 volts, register 101 will also set the logic 102 to produce a $\overline{CH}$ output. AND gate 98 will therefore produce a RESET signal on line 100 which will reset the latch 110 and remove the fault warning from line 114. This will also switch the reference level during alternate waveform portions from plus 3.00 volts back to plus 1.35 volts.

A line 122 interconnects the fault warning line 112 with an inhibit input of latch 110. Therefore, if latch 92 is set into the FIRE condition, as a result of the waveform from the detector being more negative than plus 0.5 volts during eight alternate positive portions, not only will a fire warning be produced on line 112 but latch 110 will be prevented from being switched into the FAULT state even if the detector waveform has become less negative than minus 2.2 volts during four pulses TP3. Similarly a line 123 prevents a fire warning, if latch 110 is in the "fault" state.

Figure 3:
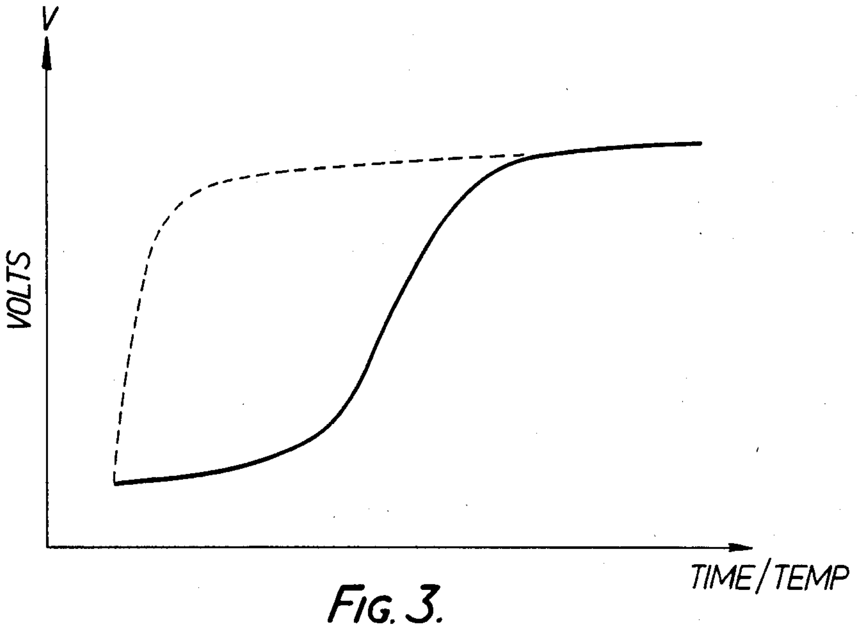

As shown in FIG. 1, an output is taken from the collector of transistor 32 on a line 128 and this is fed into an integrator 130 whose output therefore represents the inverse integral of the positive half of the waveform from the detector 10. FIG. 3 shows in full line the normal shape of the waveform produced by the integrator 130, the horizontal axis representing either time or temperature provided that the temperature is rising slowly. However, if the detector is subjected to a very fierce fire, it is found that the output of integrator 130 changes to the dotted form in FIG. 3, that is, its rate of rise increases very rapidly. The output of integrator 130 can therefore be used to provide a supplementary indication of the state of the detector 10. For example, this output can be fed on a line 132 to a suitable indicator. In other words, the indication given by the indicator indicates the "trend" detected by the detector 10.

If a fault occurs on the detector, such as due to contamination or damage and which has the effect of reducing the resistance between the conductors 12 and 14, the output of the integrator 130 will rise even more rapidly. A slope unit 136 detects such a condition and produces a fault indication on a line 138. This is fed to the register 107 and immediately switches the register to produce an output which sets latch 110 into the FAULT condition, thus providing a back-up to the fault monitoring provided by the pulses TP3.

A reset unit 140 produces a reset signal on a line 142 for resetting the various logic units of the system when the power is first switched on.

It will be appreciated that the lines interconnecting the power supply to the various units of the system have been omitted for clarity.

It will be understood that various modifications can be made to the circuit arrangement described without departing from the scope of the invention. It will also be appreciated that provision may be made for carrying out various tests on the circuit arrangement and on the detector so as, for example, to simulate fire or fault conditions and to check that an appropriate warning output is produced under such conditions.

What is claimed is:

1. An electrical circuit arrangement, comprising detecting means whose charge storage capability increases under predetermined conditions, driving means connected to the detecting means to apply thereto a continuous alternately positive and negative test waveform, the driving means incorporating circuit means providing respectively different impedances for the positive and negative portions of the waveform, and digital testing means responsive to the said waveform and operative at predetermined time instants during its positive and negative portions to compare its amplitude with predetermined reference thresholds whereby to determine asymmetry of the waveform caused by an increase in the charge storage capabilities of the detecting means.

2. An arrangement according to claim 1, in which the digital testing means comprise means operative to take first samples of the magnitude of the waveform applied to the detecting means at respective time instants during a predetermined plurality of positive waveform portions, and comparing means for comparing the magnitude of each such first sample with a first said reference threshold so as to produce a first warning output if the magnitudes of the said samples are more negative than the first reference threshold.

3. An arrangement according to claim 1, in which the said predetermined conditions include the condition of elevated temperature so that the said first warning output is indicative of elevated temperature or fire.

4. An arrangement according to claim 2, in which the detecting means has electrical resistance which decreases under predetermined conditions and in which the testing means includes means taking second samples of the waveform at predetermined time instants during negative portions thereof, and comparing means for comparing the magnitudes of a predetermined plurality of the second samples with a second said reference threshold whereby to produce a second warning output when the magnitudes of those samples are less negative than the threshold.

5. An arrangement according to claim 4, in which the said second warning output is an indication of a fault condition being one of the said predetermined conditions under which the resistance of the detecting means decreases.

6. An arrangement according to claim 4, including logic means to inhibit the production of the said second warning output if the first warning output exists.

7. An arrangement according to claim 2, in which the testing means includes resetting means operative to take other samples of the waveform at predetermined time instants during a plurality of positive and negative portions thereof, comparing means for comparing the magnitudes of a predetermined plurality of those samples with respective positive and negative further said reference thresholds whereby to produce a resetting signal, and means responsive to the resetting signal to cancel the said warning output if the magnitudes of the said other samples of the positive waveform portions are more positive than the said positive further threshold and magnitudes of the said other samples of the negative waveform portions are more negative than the said negative further threshold.

8. An arrangement according to claim 1, including integrator means connected to integrate the positive portions of the said waveform so as to produce an output increasing towards a mean value at a rate dependent on the charge storage capability of the detecting means, and means for producing a fault warning if the rate of change of the output from the integrator means exceeds a predetermined threshold.

9. An arrangement according to claim 1, in which the detecting means comprises a longitudinal detector in the form of coaxial conductors separated by temperature-responsive material which increases the charge storage capacity between the conductors as its temperature increases.

10. An arrangement according to claim 2, in which the testing means includes means for taking further samples of negative portions of the waveform, comparing means for comparing magnitudes of a plurality of the further samples with another, negative, said reference threshold and operative when the magnitudes of the further samples are less negative than the said other negative threshold to produce a change signal, and means responsive to the change signal to shift the time instants at which the said first samples are taken so as to cause them to be taken at a predetermined relatively earlier instant in each said positive waveform portion, whereby the shifted first samples can cause production of a said first warning output during the existence of a said predetermined condition which causes such distortion of the waveform as reduces the magnitude of first half of each positive portion compared with the magnitude during the second half thereof.

11. A temperature responsive system, comprising a longitudinal temperature detector of the type whose electrical charge storage capability increases with increasing temperature, driving means connected to apply a symmetrical alternately positive and negative rectangular waveform to the detector, comparing means connected to compare the instantaneous magnitude of the waveform applied to the detector with a plurality of different and predetermined thresholds whereby to produce digital signals indicating whether the instantaneous magnitude of the waveform is more positive or more negative than the respective threshold, testing means operative in response to receipt of a predetermined plurality of said digital signals indicating that, during each of the predetermined plurality of positive portions of the said waveform, the instantaneous magnitude thereof is less than a first, relatively low positive, one of the said thresholds, whereby to produce a high temperature warning output, fault sensing means operative in response to a predetermined plurality of consecutive said digital signals indicating that the instantaneous magnitude during each of a plurality of negative portions of the said waveform is less negative than a second, relatively high negative, one of the said thresholds, whereby to produce a fault warning output, and means preventing the fault warning output being produced during the existence of the high temperature warning output.

12. A method of sensing temperature increase using a temperature detector in the form of coaxial conductors separated by temperature-responsive material which increases the charge storage capacity between the conductors as its temperature increases, comprising the steps of applying a continuous alternately positive and negative test waveform to the detector through respectively different impedances for the positive and negative portions of the waveform, and sampling the test waveform at predetermined time instants during positive and negative portions thereof and comparing its amplitude with predetermined reference thresholds whereby to determine asymmetry of the waveform caused by an increase in its charge storage capacity of the detector.

13. A method according to claim 12, in which the sampling step comprises the steps of taking first samples of the magnitude of the test waveform at respective time instants during a predetermined plurality of positive portions thereof, and comparing the magnitude of each such first sample with a first said reference threshold so as to produce a first warning output if the magnitudes of the said samples are more negative than the first threshold.

14. A method according to claim 13, for use where the resistance between the conductors decreases under predetermined conditions including a fault condition, including the steps of taking second samples of the waveform at predetermined time instants during negative portions thereof, and comparing the magnitudes of a predetermined plurality of the second samples with a second said reference threshold whereby to produce a fault warning output when the magnitudes of those samples are sufficiently less negative than that threshold to indicate existence of a said fault condition.

15. A method according to claim 14, including the step of inhibiting the production of the said fault warning output if the first warning output exists.

16. A method according to claim 12, including the steps of taking other samples of the waveform at predetermined time instants during a plurality of positive and negative portions thereof, and comparing the magnitudes of a predetermined plurality of those samples with respective positive and negative further said reference thresholds whereby to produce a resetting signal, for cancelling the said warning output, if the magnitudes of the said other samples of the positive waveform portions are more positive than the positive said further threshold and the magnitudes of the said other samples of the negative waveform portions are more negative than the negative said further threshold.

17. A method according to claim 12, including the steps of integrating the positive portions of the said waveform so as to produce an output increasing towards a mean value at a rate dependent on the charge storage capacity of the detector, and producing a fault warning if the rate of change of the output from the integrator means exceeds a predetermined threshold.

18. A method according to claim 13 including the steps of taking further samples of negative portions of the waveform, comparing the magnitudes of a plurality of the further samples with another, negative, said reference threshold and operative when the magnitudes of the further samples are less negative than the other negative threshold to produce a change signal, and shifting the time instants at which the said first samples are taken, in response to the change signal, so as to cause them to be taken at a predetermined relatively earlier instant in each said positive waveform portion, whereby the shifted first samples can cause production of a said first warning output during the existence of a said predetermined condition which causes such distortion of the waveform as reduces the magnitude of first half of each positive waveform portion compared with the magnitude during the second half thereof.

19. An electrical circuit arrangement, comprising detecting means whose charge storage capability increases under predetermined conditions, driving means connected to the detecting means to apply thereto an alternately positive and negative test waveform, the driving means incorporating circuit means providing respectively different impedances for the positive and negative portions of the waveform, and digital testing means responsive to the said waveform and operative at predetermined time instants during positive and negative portions of the test waveform to determine asymmetry of the waveform caused by an increase in the charge storage capabilities of the detecting means;

the digital testing means comprising means operative to take first samples of the magnitude of the waveform applied to the detecting means at respective time instants during a predetermined plurality of positive waveform portions, comparing means for comparing the magnitude of each such first sample with a reference magnitude so as to produce a first warning output if the magnitudes of the said samples are more negative than the predetermined magnitudes, means for taking further samples of negative portions of the waveform, comparing means for comparing the magnitudes of a plurality of the further samples with a predetermined negative threshold and operative when the magnitudes of the further samples are less negative than the said threshold to produce a change signal, and means responsive to the change signal to shift the time instants at which the said first samples are taken so as to cause them to be taken at a predetermined relatively earlier instant in each said positive waveform portion, whereby the shifted first samples can cause production of a said first warning output during the existence of a said predetermined condition which causes such distortion of the waveform as reduces the magnitude of first half of each positive waveform portion compared with the magnitude during the second half thereof.

20. A method of sensing temperature increase using a temperature detector in the form of coaxial conductors separated by temperature-responsive material which increases the charge storage capacity between the conductors as its temperature increases, comprising the steps of applying an alternately positive and negative test waveform to the detector through respectively different impedances for the positive and negative portions of the waveform, and sampling the test waveform at predetermined time instants during positive and negative portions thereof to determine asymmetry of the waveform caused by an increase in its charge storage capacity of the detector; the sampling step comprising the steps of taking first samples of the magnitude of the test waveform at respective time instants during a predetermined plurality of positive waveform portions, comparing the magnitude of each such first sample with a reference so as to produce a first warning output if the magnitudes of the said samples are more negative than the predetermined magnitude, taking further samples of negative portions of the waveform, comparing the magnitudes of a plurality of the further samples with a predetermined negative threshold and operative when the magnitudes of the further samples are less negative than the said threshold to produce a change signal, and shifting the time instants at which the said first samples are taken, in response to the change signal, so as to cause them to be taken at a predetermined relatively earlier instant in each said positive waveform portion, whereby the shifted first samples can cause production of a said first warning output during the existence of a said predetermined condition which causes such distortion of the waveform as reduces the magnitude of first half of each positive waveform portion compared with the magnitude during the second half thereof.

21. An electrical circuit arrangement, comprising detecting means whose charge storage capability increases with increasing temperature and whose electrical resistance decreases with increasing temperature and also under certain fault conditions, driving means connected to the detecting means to apply thereto a continuous alternately positive and negative test waveform, the driving means incorporating circuit means providing respectively different impedances for the positive and negative portions of the waveform, first digital testing means responsive to the said waveform and operative at predetermined time instants during certain of its said waveform portions to compare its amplitude with a predetermined reference threshold whereby to determine asymmetry of the waveform caused by an increase in the charge storage capabilities of the detecting means and a decrease in its electrical resistance and thereby to detect an increased temperature condition, and second digital testing means responsive to the said waveform and operative at predetermined time instants during certain waveform portions to compare its amplitude with a different predetermined reference threshold whereby to determine different asymmetry of the waveform caused by a decrease in the electrical resistance of the detecting means following a said fault condition.

22. A circuit arrangement according to claim 21, in which the first digital testing means comprises means operative to take first samples of the magnitude of the waveform applied to the detecting means at respective time instants during a predetermined plurality of positive waveform portions, and comparing means for comparing the magnitude of each such first sample with a first said reference threshold so as to produce a first warning output, corresponding to elevated temperature, if the magnitudes of the said samples are more negative than the first reference threshold.

23. An arrangement according to claim 21, in which the digital testing means includes means taking second samples of the waveform at predetermined time instants during negative portions thereof, and comparing means for comparing the magnitudes of a predetermined plurality of the second samples with the second said reference threshold whereby to produce a second warning output, indicative of the said fault condition, when the magnitudes of those samples are less negative than that threshold.

* * * * *